United States Patent Office.

SAMUEL H. YOUNG, OF ST. LOUIS, MISSOURI.

*Letters Patent No. 64,467, dated May 7, 1867.*

---

IMPROVED MODE OF DISINFECTING COFFINS.

---

*The Schedule referred to in these Letters Patent and making part of the same.*

---

TO ALL WHOM IT MAY CONCERN:

Be it known that I, SAMUEL H. YOUNG, of the city and county of St. Louis, State of Missouri, have invented a new and useful Deodorizer and Disinfectant of Corpses; and I do hereby declare that the following is a full and exact description of the production, application, and action of the same.

The nature of my invention relates, firstly, to the generation of a gas, which, in its action upon the noxious gases of decomposition forming in corpses, shall effectively be a deodorizer and disinfectant; and, secondly, to the method of applying said gas, it being in such wise that the said gas shall penetrate to every part of the receptacle of the corpse, and thus bring each and every part of the noxious gases of decomposition under its action. The great advantages arising from the adoption of the foregoing correct bases of my invention will hereinafter be more specially mentioned.

I will now proceed to describe the application of my invention, and its working during such application, to human bodies. After a corpse has been placed into the coffin, delays are frequently caused by various and sundry causes before such corpse is buried. Especially during the warmer seasons of the year, corpses very soon emit noxious vapors of decomposition; moreover, when the subject has been infected with certain contagious diseases, such vapors of decomposition are contagious. In order, therefore, to effectually take from said vapors of decomposition their noxious and sometimes deadly nature, I arrange at some point in the coffin, usually at the knee region of the corpse, a receptacle box. This may be simply made of wood, having four solid sides and a tight bottom. The interior of this box I coat with beeswax or asphaltum, to make it fluid-tight, and otherwise secure it. The only other addition there is needed to the coffin is an escape-tube, which may be conveniently arranged, either secured to the coffin-lid or to the sides. The object of this tube is to permit the deodorized and disinfected gases to escape. As it requires but the exercise of a usual amount of judgment on the part of those skilled in these arts, I will not specially describe any arrangement or combination of said box and escape-tube with the coffin, but I will generally state that the disinfectant gas, after passing from the aforesaid box, must be caused to traverse as much of the entire space of the coffin as possible before it passes into the air. Into said box, coated with beeswax or asphaltum, as stated, I place a coil of hemp or other fibrous substances; for a full-grown and capacious corpse I then apply the following chemical substances in the proportions stated: Moisten the fibrous coil in the box with one-half ($\frac{1}{2}$) pint of strong mercantile vinegar, or its equivalent of acetic acid; add one (1) pound avoirdupois of chloride of lime; spread this in such wise as to form a cone-like receptacle for one (1) ounce avoirdupois of sulphuric acid; stir the moist mixture to a paste, and thereupon close the coffin. Among said parts in said box there will take place the following chemical reactions: the chloride of lime will be decomposed in the presence of the other chemical substances, and sulphate of lime or gypsum formed, whereby chlorine gas is set free; as the other chemical reactions are not of importance hereto, they are not here specially mentioned. I would state that the duration of this emission or generation of chlorine gas is in my experience about one week, and this a length of time ample for purposes of transportation, &c., of corpses. During the generation of chlorine gas, as described, the corpse is emitting the various vapors of decomposition, the same being various gases, such as sulphuretted hydrogen, phosphoretted hydrogen, ammonia, and others, most or all of which are noxious to smell, and many carrying with them the incubus of any contagious disease which may have been lodged in the subject. I now claim that the action of said chlorine gas upon such vapors of decomposition will, in accordance with the chemical laws, reduce said vapors chemically, usually forming chlorine acids and water; but, moreover, that the action of chlorine will be to disinfect said vapors. I am well aware that the action of chlorine gas as a disinfectant and deodorizer is in the knowledge of chemists, but I do herewith assert that the application of this powerful and effective agent for the purpose aforesaid upon corpses is new and is specially my invention, based upon a great number of experiments. It will be seen that in thus generating chlorine gas, and causing it to spread over the entire interior of the coffin, the disinfectant and deodorizer acts upon all vapors as they form at all parts of the corpse. There is therefore no necessity for an air-tight coffin, with a single special escape-tube. Usually in common wooden coffins, in order to reduce the pressure caused by the gases, an escape-tube should be used; but I specially claim as an advantage of this method of applying the chlorine gas that all vapors which may or can escape at any other points other than the escape-tube before mentioned must also and will also be both deodorized and disinfected. In this, therefore, the successful working of my invention is independent of the skill of the workman constructing the coffin, and independent of quality of the material of the coffin. This improved feature of my invention renders it of great value in cases of corpses infected with contagion.

Having thus described my invention, what I claim, is—

1. Deodorizing and disinfecting corpses by enclosing the same in a receptacle wherein chlorine or other equivalent disinfecting gas is continuously generated and liberated, substantially in the manner and for the purposes herein set forth.

2. The combination of a disinfecting and deodorizing compound with the interior of a coffin in such a manner as that there shall be a gradual and constant generation and liberation of a disinfecting and deodorizing vapor in the coffin, substantially in the manner and for the purpose herein set forth.

SAMUEL H. YOUNG.

Witnesses:
    GEO. N. LYNCH,
    GEO. P. HERTHEL, Jr.